US010425420B2

(12) United States Patent
Kovega

(10) Patent No.: US 10,425,420 B2
(45) Date of Patent: Sep. 24, 2019

(54) METHOD OF AND SYSTEM FOR GENERATING USER PROFILES

(71) Applicant: YANDEX EUROPE AG, Lucerne (CH)

(72) Inventor: Dmitriy Nikolaevich Kovega, Mytishchi (RU)

(73) Assignee: Yandex Europe AG, Lucerne (CH)

( * ) Notice: Subject to any disclaimer, the term of this patent is extended or adjusted under 35 U.S.C. 154(b) by 195 days.

(21) Appl. No.: 15/699,030

(22) Filed: Sep. 8, 2017

(65) Prior Publication Data

US 2018/0077166 A1 Mar. 15, 2018

(30) Foreign Application Priority Data

Sep. 12, 2016 (RU) ................................ 2016136532

(51) Int. Cl.
*H04L 29/06* (2006.01)
*H04L 29/08* (2006.01)

(52) U.S. Cl.
CPC ............ *H04L 63/102* (2013.01); *H04L 63/08* (2013.01); *H04L 67/306* (2013.01)

(58) Field of Classification Search
None
See application file for complete search history.

(56) References Cited

U.S. PATENT DOCUMENTS

| 8,621,586 | B1 | 12/2013 | Peer et al. | |
|---|---|---|---|---|
| 9,398,452 | B1 * | 7/2016 | Upp | .................... H04W 12/04 |
| 2003/0220976 | A1 * | 11/2003 | Malik | ..................... H04L 51/04 |
| | | | | 709/206 |
| 2005/0229001 | A1 | 10/2005 | Brown et al. | |
| 2006/0248332 | A1 | 11/2006 | Kim et al. | |
| 2006/0282660 | A1 * | 12/2006 | Varghese | ............. G06Q 20/341 |
| | | | | 713/155 |
| 2008/0148376 | A1 * | 6/2008 | Onozawa | ................. G06F 21/41 |
| | | | | 726/8 |
| 2010/0036783 | A1 * | 2/2010 | Rodriguez | ............ G06F 21/316 |
| | | | | 706/15 |
| 2011/0154258 | A1 | 6/2011 | Hope et al. | |
| 2014/0101745 | A1 | 4/2014 | Sirota | |

(Continued)

FOREIGN PATENT DOCUMENTS

| RU | 2440688 C2 | 1/2012 |
|---|---|---|
| RU | 2523304 C2 | 7/2014 |

*Primary Examiner* — Henry Tsang
(74) *Attorney, Agent, or Firm* — BCF LLP

(57) ABSTRACT

There are disclosed methods of and systems for generating a user profile. The method is executable at a server, the server having previously generated a first profile of a first user. The first profile of the first user has been stored in a first database. The method comprises: receiving a request to provide access to the first profile of the first user; retrieving the first profile of the first user from the first database; in response to at least one user interaction parameter in the request differing from the user interaction parameters in the first profile of the first user, performing a verification action associated with the first user; upon receiving a confirmation in response to the verification action, generating a second profile of the first user including the at least one interaction parameter of the first user, which is different from the interaction parameters in the first profile.

12 Claims, 3 Drawing Sheets

(56) References Cited

U.S. PATENT DOCUMENTS

| | | | |
|---|---|---|---|
| 2014/0297528 A1* | 10/2014 | Agrawal | G06Q 20/40145 |
| | | | 705/44 |
| 2014/0325682 A1 | 10/2014 | Turgeman et al. | |
| 2015/0047000 A1* | 2/2015 | Spencer, III | H04L 63/0876 |
| | | | 726/7 |
| 2015/0205955 A1 | 7/2015 | Turgeman | |
| 2015/0324563 A1* | 11/2015 | Deutschmann | H04L 67/22 |
| | | | 726/7 |

* cited by examiner

METHOD OF AND SYSTEM FOR GENERATING USER PROFILES

CROSS-REFERENCE

The present application claims priority to Russian Patent Application No. 2016136532, filed Sep. 12, 2016, entitled "Method Of And System For Generating User Profiles" the entirety of which is incorporated herein.

FIELD OF THE TECHNOLOGY

The present technology relates to methods and systems for processing a user access to a service, specifically to methods of and systems for generating a user profile and using the user profile for user authentication.

BACKGROUND

These days, a typical user of an electronic device has access to a plurality of applications, each of the plurality of applications being designed to help the user to solve a particular user-problem. For example, an e-mail application is designed to enable a user to send and receive electronic messages, either for work or pleasure purposes. A web browser allows the user to browse the Internet for resources that may be responsive to user queries, again, both for work-related and personal-related matters.

A typical service provider provides a number of electronic user-services, such as an e-mail service, a cloud storage service, a scheduling service, a movie download service and the like.

The user has access to a number of electronic devices (be it a desktop computer, a laptop computer, a wireless communication device, a smart TV or the like). Most of these electronic devices are connected to the Internet to help the user to solve one or more of user problems by accessing the Internet and finding resources that were created to help the user to solve her problems. Unfortunately, some malicious individuals can take advantage of such wide-spread proliferation of electronic devices coupled to the Internet to satisfy their malicious intents.

For example, some of such malicious individuals and organizations can "hack into" various user accounts and use them, for example, to access confidential user data, to bulk send unwanted e-mails (also known as SPAM), etc.

There are various techniques that are configured to prevent unauthorized access to a user account. One of such techniques may include generating a user profile having a user environment (user interaction parameters), which can be used by a user to access the service. Examples of the user interaction parameters may include geo-location data, IP-address, a browser, an operation system and others. If the user is trying to access the service with the unusual user interaction parameter, for example, from the location that differs from the one in the user profile, the service suggests the user to pass an additional verification. For example, the verification action can include: entering the phone number or answering another verification question or, for example, sending a message to the phone number and entering a verification code from the message to access the service.

U.S. Pat. No. 8,621,586 (published Dec. 31, 2013) teaches a method of using baselines profiles for adaptive authentication. An improved technique of processing an authentication request from an authentication requestor involves an adaptive authentication device comparing a behavioral history of fact values associated with a user over a current time window with a user's baseline profile that includes a behavioral history of the fact values. The adaptive authentication device accesses such a behavioral history over several previous time windows from a database whose entries include a user identifier, a time interval and user data which represents fact value behavioral history over the time interval. When the device receives an authentication request from an authentication requestor, the adaptive authentication device matches a username of the request with a user identifier of an entry of the database whose time period is the current time period. The adaptive authentication device then updates fact values representing the user's current behavioral history and compares the current behavioral history to the user's baseline profile.

US patent application 2006/248332, published Nov. 2, 2006, teaches a method and apparatus for providing a user-adapted service environment. The method includes authenticating a user, transmitting first user identification information for identifying the authenticated user to a controlled device, receiving a user profile corresponding to the first user identification information from the controlled device, and configuring a service environment using the received user profile.

US patent application 2005/0229001, published Oct. 13, 2005 teaches a system and associated method for providing the access to at least one specified application within a software system. The software system comprises security software and a software tool suite. The security software is adapted to authorize a user to access at least one specified application on a computer system comprising a security standard. The software tool suite is adapted to create or modify a user profile for the user. The user profile comprises at least one transaction necessary for the user to access the at least one specified application. The software tool suite is adapted to integrate in real time the user profile into the security software. The software tool suite is adapted to create a user profile report in real time to verify that the user profile is in compliance with the security standard of the computer system.

SUMMARY

It is an object of the present technology to enhance the set of tools of the specific purpose and to suggest new methods and systems for generating a user profile and user authentication. Some embodiments the present technology allow to ameliorate some of the inconveniences present in the prior art.

Embodiments of the present technology have been developed based on developers' appreciation of at least one shortcoming of the prior art approaches.

One of the disadvantages of the prior art is that too frequent of updates of the user profile can create an additional computational load on the server, and too rare of updates of the user profile can create inconveniences for the user and the additional load on the server and the communication channel associated with multiple sending of verification questions when the user interaction parameters change.

For example, if the user buys a new device and uses the new device to log into an electronic service, the electronic service sends a verification question, due to the fact that the user current interaction parameter (e.g. device, operating system, browser, etc.) is different from those stored in the user profile. Prior to updating the user profile, every time when the user is logging in using the new device, (s)he will get an additional verification question (verification action), which may cause some inconvenience to the user and additional load on the server and the communication channels.

In case of frequent updates of the user profile, for example, after every login and correct answer to the verification question (confirmation check) the user will not be repeatedly sent a verification question when logging in with a new device, but keeping the user profile up-to-date may create an excessive load on the server. This is especially true in those cases where the change of the interaction parameter is only temporary, e.g., the user did not buy a new device and was using another person's device to obtain one-time access to the electronic service.

For example, in a scenario where a smartphone battery of the user's smartphone is out of charge and the user decides to check his (her) email using other user's smartphone. However, (s)he is not going to use this smartphone to access the email service in the future, and thus updating the interaction parameter in the user profile in this case would be impractical. Moreover, adding another user's smartphone as the interaction parameter in the user profile can create an additional threat of unauthorized access to the user account.

According to a first broad aspect of the present technology, there is provided a method of generating a user profile, the method executable at a server, the server having previously generated a first profile of a first user based on user interaction parameters received over a predetermined period of time and associated with a plurality of communication sessions, the first profile of the first user having been stored in a first database associated with the server. The method comprises: receiving a request to provide access to the first profile of the first user; retrieving the first profile of the first user from the first database; in response to at least one user interaction parameter in the request differing from the user interaction parameters in the first profile of the first user, performing a verification action associated with the first user; upon receiving a confirmation in response to the verification action, generating a second profile of the first user including the at least one interaction parameter of the first user, which is different from the interaction parameters in the first profile of the first user.

In some implementations of the method, the second profile of the first user has a limited activity period.

In some implementations of the method, upon expiration of the limited activity period, the method further comprises deleting the second profile of the first user.

In some implementations of the method, the method further comprises in response to receiving a second request to provide the access to the second profile of the first user: retrieving the second profile of the first user and the first profile of the first user; in response to the user interaction parameter in the received second request being different from the user interaction parameters in the first profile of the first user, but matching the interaction parameter in the second profile of the first user, updating the activity period of the second profile of the first user.

In some implementations of the method, the method further comprises: periodically updating the first profile of the first user, the periodically updating including: adding, to the first profile of the first user the interaction parameter of the first user from the second profile of the first user, the adding being executed in response to the second profile of the first user being non-expired at a given iteration of the periodically updating.

In some implementations of the method, the activity period of the second profile of the first user does not exceed an updating period of the first profile of the first user.

In some implementations of the method, the method further comprises in response to receiving a second request to provide the access to the second profile of the first user: retrieving the second profile of the first user and the first profile of the first user; in response to at least one user interaction parameter in the received second request differing from both the user interaction parameters in the first profile of the first user and the second profile of the first user, performing a second verification action associated with the first user; upon receiving the confirmation in response to the second verification action, generating a third profile of the first user including the at least one interaction parameter of the first user, which is different from the interaction parameters in the first profile of the first user and the second profile of the first user.

In accordance with another broad aspect of the present technology, there is provided a server. The server comprises: at least one database; a processor configured to access the at least one database, the processor having previously generated a first profile of the first user based on user interaction parameters received over a predetermined period of time and associated with a plurality of communication sessions, the first profile of the first user having been stored in the first database; the processor being further configured to: receive a request to provide access to the first profile of the first user; retrieve the first profile of the first user from the first database; in response to at least one user interaction parameter in the received request differing from the user interaction parameters in the first profile of the first user, perform a verification action associated with the first user; upon receiving the confirmation in response to the verification action, generate a second profile of the first user including the at least one interaction parameter of the first user, which is different from the interaction parameters in the first profile of the first user.

In accordance with another broad aspect of the present technology, there is provided a method authenticating a user, the method executable at a server. The method comprises: receiving a request to provide the access to a profile of a first user; retrieving from a first database a first profile of the first user, the first profile of the first user including a set of user interaction parameters; in response to at least one user interaction parameter in the request differing from the user interaction parameters in the first profile of the first user, performing a verification action associated with the first user; upon receiving a confirmation in response to the verification action, generating a second profile of the first user including the at least one interaction parameter of the first user, which is different from the interaction parameters in the first profile of the first user; receiving a second request to provide the access to the profile of the first user, the second request being associated with the first user, retrieving the first profile of the first user and the second profile of the first user; in response to the user interaction parameters in the second request matching the interaction parameters of the first user in the first profile of the first user or the second profile of the first user, providing the user with the access to the profile of the first user.

In some implementations of the method, in response to at least one user interaction parameter in the second request differing from the user interaction parameters in the first profile of the first user and the second profile of the first user, performing a second verification action associated with the first user.

In some implementations of the method, upon the receiving a confirmation in response to the second verification action, generating a third profile of the first user, including the at least one interaction parameter of the first user, which is different from the interaction parameters in the first profile of the first user and the second profile of the first user, and providing the access to the user profile.

In some implementations of the method, the profile of the first user is associated with at least one service, and wherein the providing the access to the profile of the first user comprises providing the access to the at least one service associated with the profile of the first user.

In some implementations of the method, the user interaction parameter comprises one of: a network address associated with a user device used for establishing communication sessions with the user device; geo-location information associated with a location of the user device; a version of a browser application used to establish communication sessions with the user device; a version of an operating system of the user device, a click-pattern associated with a user of the user device; a mouse movement pattern associated with the user of the user device; a input pattern associated with the user of the user device; a function usage pattern associated with the user of the user device; a time pattern of usage of the user device by the user.

In some implementations of the method, the second profile of the first user has a limited activity period.

In some implementations of the method, expiration of the limited activity period, the method further comprises deleting the second profile of the first user.

In some implementations of the method, in response to the user interaction parameter in the second request being different from the user interaction parameters in the first profile of the first user, but matching the interaction parameter in the second profile of the first user, the method further comprises updating the activity period of the second profile of the first user.

In some implementations of the method, the method further comprises: periodically updating the first profile of the first user, the periodically updating including: adding, to the first profile of the first user the interaction parameter of the first user from the second profile of the first user, the adding being executed in response to the second profile of the first user being non-expired at a given iteration of the periodically updating.

In some implementations of the method, the activity period of the second profile of the first user does not exceed the updating period of the first profile of the first user.

In accordance with another broad aspect of the present technology, there is provided a server for authenticating a user. The server comprises: at least one database; a processor coupled to the at least one database, the processor configured to: receive a request to provide the access to a profile of a first user; retrieve from a first database a first profile of the first user, the first profile of the first user including a set of user interaction parameters; in response to at least one user interaction parameter in the request differing from the user interaction parameters in the first profile of the first user, perform a verification action associated with the first user; upon receiving a confirmation in response to the verification action, generate a second profile of the first user including the at least one interaction parameter of the first user, which is different from the interaction parameters in the first profile of the first user; receive a second request to provide the access to the profile of the first user, the second request being associated with the first profile of the first user and the second profile of the first user; in response to the user interaction parameters in the second request matching the interaction parameters of the first user in the first profile of the first user or the second profile of the first user, provide the user with the access to the profile of the first user.

In the context of the present specification, unless provided expressly otherwise, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

In the context of the present specification, unless provided expressly otherwise, the expression "information" includes information of any nature or kind whatsoever capable of being stored in a database. Thus information includes, but is not limited to audiovisual works (images, movies, sound records, presentations etc.), data (location data, numerical data, user names, passwords, email addresses, etc.), text (opinions, comments, questions, messages, etc.), documents, spreadsheets, etc.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless provided expressly otherwise, the expression "component" is meant to include software (appropriate to a particular hardware context) that is both necessary and sufficient to achieve the specific function(s) being referenced.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Additional and/or alternative features, aspects, and advantages of embodiments of the present disclosure will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
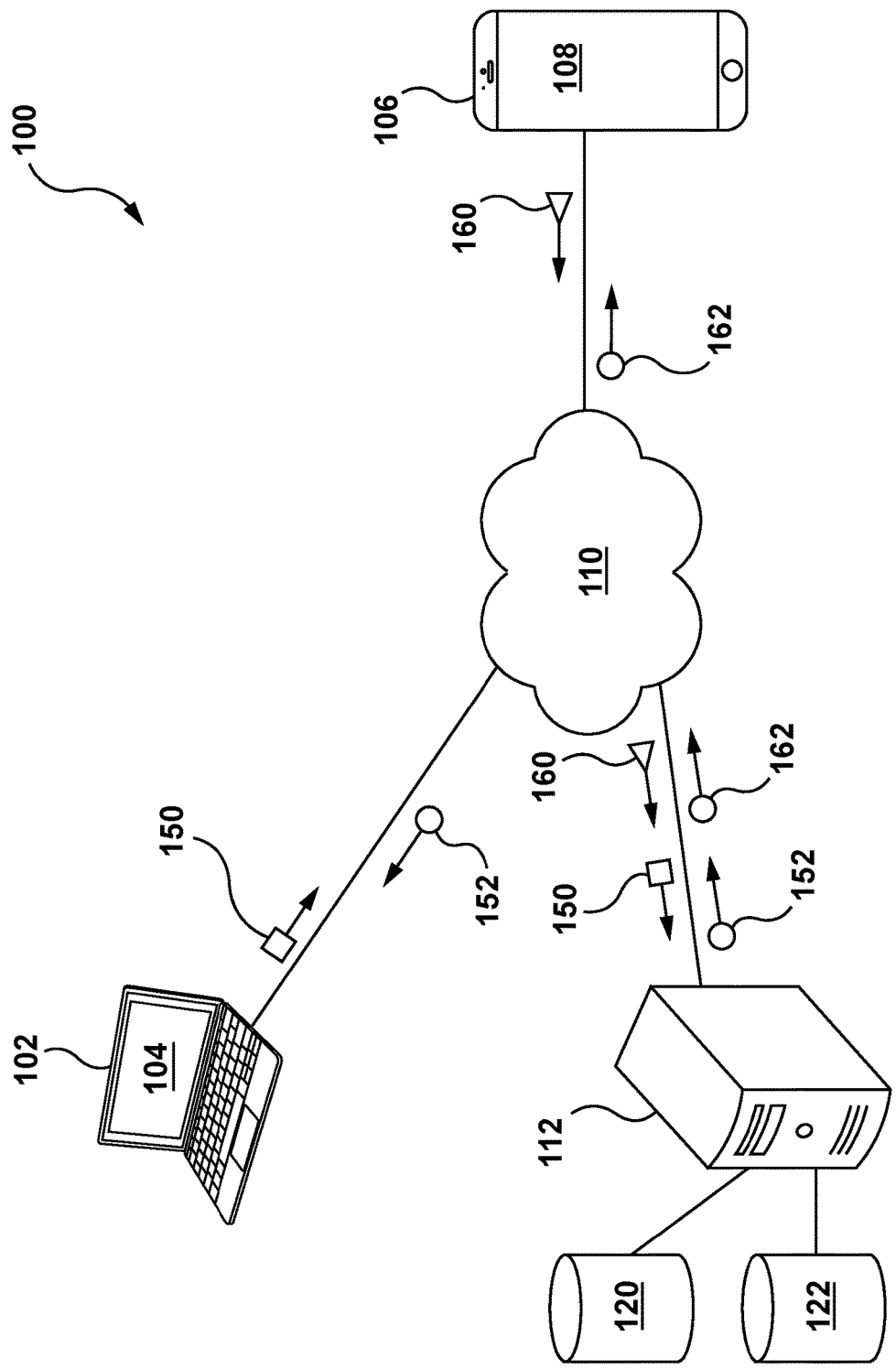
FIG. 1 depicts a schematic representation of a system implemented in accordance with non-limiting embodiments of the present technology.

FIG. 1 schematically depicts a system 100. It is to be expressly understood that the system 100 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below.

This is done merely as an aid to understanding, and, again, not to define the scope or set forth the bounds of the present technology. These modifications are not an exhaustive list, and, as a person skilled in the art would understand, other modifications are likely possible. Further, where no examples of modifications have been set forth, it should not be interpreted that no modifications are possible and/or that what is described is the sole manner of implementing that element of the present technology. As a person skilled in the art would understand, this is likely not the case. In addition it is to be understood that the system 100 may provide in certain instances a simple implementation of the present technology, and that where such is the case they have been presented in this manner as an aid to understanding. As persons skilled in the art would understand, various implementations of the present technology may be of a greater complexity.

FIG. 1 depicts the system 100 implemented in accordance with one non-limiting embodiment of the present technology. The system 100 comprises a first electronic device 102. The first electronic device 102 is typically associated with a user (not depicted) and, as such, can sometimes be referred to as a "client device". It should be noted that the fact that the first electronic device 102 is associated with the user does not need to suggest or imply any mode of operation—such as a need to log in, a need to be registered or the like.

The implementations of the first electronic device 102 are not particularly limited, but as an example, the first electronic device 102 may be implemented as a personal computer (desktops, laptops, netbooks, etc.), a wireless electronic devices (a cell phone, a smartphone, a tablet and the like), as well as network equipment (a router, a switch, or a gateway). The general implementation of the first electronic device 102 is known in the art and, as such, will not be described here at much length. Suffice it to say that the first electronic device 102 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communications network 110; and a processor coupled to the user input interface, the user output interface and the network communication interface, the processor being configured to execute various routines, including those described herein below. To that end the processor may store or have access to computer readable instructions which instructions, when executed, cause the processor to execute the various routines described herein.

The system 100 further comprises a second electronic device 106. The second electronic device 106 is also associated with the user and, as such, can sometimes be referred to as a "client device". It should be noted that the fact that the second electronic device 106 is associated with the user does not need to suggest or imply any mode of operation—such as a need to log in, a need to be registered or the like.

The implementations of the second electronic device 106 are not particularly limited, but as an example, the second electronic device 106 may be implemented as a personal computer (desktops, laptops, netbooks, etc.), a wireless electronic devices (a cell phone, a smartphone, a tablet and the like), as well as network equipment (a router, a switch, or a gateway). The general implementation of the second electronic device 106 is known in the art and, as such, will not be described here at much length. Suffice it to say that the second electronic device 106 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over the communications network 110; and a processor coupled to the user input interface, the user output interface and the network communication interface, the processor being configured to execute various routines, including those described herein below. To that end the processor may store or have access to computer readable instructions which instructions, when executed, cause the processor to execute the various routines described herein.

As an illustrative example in FIG. 1 the first electronic device 102 is depicted as a laptop, and the second electronic device 106 is depicted as a smartphone. However, this is as an example only, and the implementations of the first electronic device 102 and the second electronic device 106 may be the same or may differ. Moreover, there are possible embodiments of the present technology, in which the first electronic device 102 and the second electronic device 106 are the same physical device.

The first electronic device 102 and the second electronic device 106 comprise hardware and/or software and/or firmware (or a combination thereof), to execute a network application 104 and a network application 108 respectively. Generally speaking, the nature of the network application 104 and the network application 108 is not particular limited. In various embodiments of the present technology, the network application 104 and the network application 108 may allow the user to implement at least one of: sending and receiving electronic messages (e.g., emails, text messages, multimedia messages, and the like), browsing network resources (e.g., searching and/or accessing various web resources), and the like.

For the purposes of the examples to be provided herein below, it shall be assumed that each of the network application 104 and the network application 108 is executed as an e-mail application.

Furthermore, the system 100 comprises the above-mentioned communications network 110. In some non-limiting embodiments of the present technology, the communications network 110 can be implemented as the Internet. In other embodiments of the present technology, the communications network 110 can be implemented differently, such as any wide-area communications network, local-area communications network, a private communications network and the like.

The first electronic device 102 is coupled to the communications network 110 via a first communication link (not separately numbered), and the second electronic device 106 is coupled to the communications network 110 via a second communication link (not separately numbered). How the first communication link and the second communication link are implemented is not particularly limited and will depend on how the associated first electronic device 102 and second electronic device 106 are implemented.

For example, recalling that the first electronic device 102 is implemented, in this case, as a laptop, the first communication link can be either wireless (such as the Wireless Fidelity, or WiFi™ for short, Bluetooth™ or the like) or wired (such as an Ethernet based connection).

As another example, recalling that the second electronic device 106 is implemented, in this example, as a smartphone computer and, as such, the second communication link can be wireless—such as the Wireless Fidelity, or WiFi™ for short, Bluetooth™ or the like or cellular (such as 3G, LTE and the like).

The system 100 further comprises a server 112 coupled to the communications network 110 via a communication link (not separately numbered). The server 112 may be implemented as a conventional computer server. In an example of an embodiment of the present technology, the server 112 may be implemented as a Dell™ PowerEdge™ Server running the Microsoft™ Windows Server™ operating system. Needless to say, the server 112 may be implemented in any other suitable hardware and/or software and/or firmware or a combination thereof. In the depicted non-limiting embodiment of present technology, the server 112 is a single server. In alternative non-limiting embodiments of the present technology, the functionality of the server 112 may be distributed and may be implemented via multiple servers.

Given the above examples of the network application 104 and the network application 108 being implemented as e-mail applications, the server 112 can be implemented as an e-mail server.

The implementation of the server 112 is well known. However, briefly speaking, the server 112 comprises a communication interface (not depicted) structured and configured to communicate with various entities via the communications network 110 (such as the first electronic device 102, the second electronic device 106, and other devices potentially coupled to the communications network 110). The server 112 further comprises at least one computer processor (not depicted) operationally connected with the communication interface and structured and configured to execute various processes to be described herein.

In order to authenticate the user into the e-mail service provided by the server 112, the user typically has to provide log in credential to authenticate herself to the server 112. The log in credentials can be a combination of a log in name and a password, or any other suitable authentication means.

For the purposes of the description below, it shall be assumed that the user may be authorized in an network application 104 (being an e-mail application) and/or network application 108 (being an e-mail application) at the same time or at different moments of time. In other words and as an example only, it shall be assumed that the user has provided her log in credentials and password through both the network application 104 and the network application 108. As such, the first electronic device 102 has a first communication session established between the first electronic device 102 and the server 112. The second electronic device 106 has a second communication session established between the second electronic device 106 and the server 112.

The processor of the server 112, while executing the machine-readable instructions, is configured to generate the user profile and to store it in the first database 120. The user profile can be generated automatically while generating a new user account, and every time the user logs into the account, the user interaction parameters can be updated and/or stored in the user profile in the first database 120. It should be noted that the first database 120 can be located at the server 112 itself or at the external hardware, for example, separate server for storing data. Irrespective of where the first database 120 is hosted, the server 112 has access to the first database 120. The server 112 is configured to retrieve a stored user profile from the first database 120. Furthermore, the server 112 can also be associated with other databases, for example, a second database 122, as shown in FIG. 1 and a third database (not shown).

The server 112 is configured to receive a request to provide access to the profile of the first user and, in response thereto, to retrieve a first profile of the first user from the first database 120 (the first profile of the first user being a current profile associated with the first user). It is noted that the first profile of the first user may have been generated, by the server 112, based on user credentials of the first user (for example, a login and a password) and past user interaction parameters received for a predetermined time period and associated with a plurality of communication sessions, that had been established using the credentials.

The server 112 is configured to receive requests via the communications network 110, the requests for allowing the first user to access the first profile of the first user stored in the first database 120. The so-received request is received from the network application 104 of the first electronic device 102 and the network application 108 of the second electronic device 106. The request includes user credentials. The server 112 is configured to provide access or deny access as a response to the request based on the user credentials stored in the first profile associated with the first user.

More specifically, FIG. 1 depicts a first request 150 as generated by the first electronic device 102 and a second request 160 generated by the second electronic device 106. Naturally, in alternative non-limiting embodiments of the present technology, the first request can be generated by the second electronic device 106, and the second request 160 can be generated by the first electronic device 102. In one possible embodiment of the method, the first request 150 and the second request 160 can be generated by the same electronic device.

The server 112 is also configured to analyze the communication sessions (and various parameters associated therewith) associated with the first electronic device 102 and the second electronic device 106. Generally speaking, the server 112 is configured to analyze one or more of the user sessions to determine if the user initiating or handling those user sessions is indeed an authorized user of the electronic service that the user is requesting access to. As those skilled in the art will appreciate, even though the correct log in credentials may have been presented during the log in operation, the user presenting the correct log in credentials may in fact not be the actual authorized user.

For example, it is possible that the user credentials have been mis-appropriated, for example, by a spam robot (not depicted) or by a malicious individual. As is known to those of skill in the art, the spam robot may maliciously use one of the un-authorized logins to send out malicious communication, such as spam emails and the like. It should be expressly understood that teachings presented herein are not limited to any specific purpose for which given log in may be mis-appropriated.

The server 112, has access to the first database 120 that is configured to store user profiles, including the profile of the first user. The user profile associated with the first user includes the interaction parameters of the first user. In some embodiments of the present technology, the first database 120 stores an indication of interaction parameters to the given set of credentials of a given user. For example, the database can store an indication of interaction parameters of the first user (in a form of behavior models or the like of the first user).

In accordance with non-limiting embodiments of the present technology, the server 112 is configured to determine the user interaction parameters and to store an indication thereof in the database 120. Within various non-limiting embodiments of the present technology, the server 112 is configured to determine user interaction parameters based on at least one of a device-specific parameter and a user-device interaction parameter.

In accordance with non-limiting embodiments of the present technology, the device-specific parameter is generally indicative of one or more electronic devices (such as the first electronic device 102) that the user typically uses to establish the user communication sessions with the server 112. Implementations of the device-specific parameter are not limited, and may include, inter alia: a network address associated with one or several electronic device(s) (e.g. first electronic device 102), which is(are) the usually used by the user to establish connections; a version of the browser application installed and used by the user on one or several electronic devices, which is(are) the usually used by user to establish connections; a version of the operating system installed on the electronic device, geo-location data associated with the usual location of the electronic device.

In accordance with non-limiting embodiments of the present technology, the user interaction parameter with the device, in general, indicates an action type, which the user typically performs using one or more electronic devices to establish connections with the server 112.

The user interaction parameter can be implemented as one or more of: a time pattern of the user (i.e. when the user sessions are usually established); a click-pattern associated with the user; a mouse movement pattern associated with the user; an input pattern associated with the user; a function usage pattern associated with the user.

The following is meant to provide some of the specific examples to how the above device-specific parameters and the user-device interaction parameters can be used for establishing the user behavior model.

In some implementations of the present technology, the server 112 can obtain the first request 150 to provide the access to the profile of the first user from the first electronic device 102. It should be noted that at the time of the receiving of the first request 150, the first profile of the first user has been previously generated by the server 112 based on the user interaction parameters received over the predetermined period of time and associated with the plurality of communication sessions. It is also noted that the first profile of the first user has been stored in the first database 120.

In response to receiving the first request 150, the server 112 is configured to retrieve the first profile of the first user from the first database 120 and to compare the user interaction parameters contained in the first profile of the first user with the current interaction parameters of the user, who sent the first request 150 to provide the access to the profile of the first user. In response to all of the user interaction parameters in the first profile of the first user matching the user interaction parameters during the current communication session while sending the first request 150, the server 112 is configured to provide the access to the profile of the first user.

It should be understood, that in the present context, the first profile of the first user is associated with at least one service (for example, the email service) and providing the access to the profile of the first user should means providing access to the at least one service associated with the profile of the first user.

On the other hand, in response to at least one user interaction parameter in the received the first request 150 differing from the user interaction parameters stored in the first profile of the first user, the server 112 is configured to perform a verification action associated with the first user. The verification action can comprise, for example, sending a control request 152 to the first electronic device 102, which has sent the first request 150. Alternatively or additionally, the verification action can comprise sending an SMS with a code on a mobile phone associated with the first user. Other verification actions are of course possible.

In those cases where the verification action is not confirmed, (for example, no correct answer to the control request 152 was provided), the server 112 is configured to deny the access to the profile of the first user in response to the first request 150 received from the first electronic device 102.

Upon receiving the confirmation, in response to the verification action, the server 112 is configured to generate a second profile of the first user including the at least one interaction parameter of the first user, which is different from the interaction parameters stored in the first profile of the first user. The second profile of the first user can be stored, for example, in the second database 122 available to the server 112. In alternative non-limiting embodiments of the present technology, the second profile of the first user can be stored in the first database 120 or any other database available to the server 112.

In accordance with some non-limiting embodiments of the present technology, the second profile of the first user has a limited activity period. For example, the activity period can be 1 hour or, for example, 10 hours. The limited activity period can be predetermined or vary for various profiles of the first user depending on the difficulty of the verification action.

In response to receiving the first request 150 to provide access to the profile of the first user with the first electronic device 102 during the limited activity period of the second profile of the first user, provided that the user interaction parameter matches the interaction parameter in the second profile of the first user or the user interaction parameters in the first profile of the first user, the server 112 is configured to provide access to the profile of the first user without any additional verification actions.

In accordance with some non-limiting embodiments of the present technology, after expiration of the limited activity period, the second profile of the first user is deleted from the second database 122.

In one possible embodiment of the present technology, the server 112 is configured to periodically update the first profile of the first user, and at least one interaction parameter of the first user from the second profile of the first user that is still active at the moment of updating of the first profile of the first user, is added to the first profile of the first user.

In accordance with some non-limiting embodiments of the present technology, the activity period of the second profile of the first user does not exceed the updating period of the first profile of the first user. For example, the first profile of the first user is updated once per day, and the period of activity of the second profile of the first user can be one hour. If at the moment of updating the first profile of the first user, the second profile of the first user is still active, the user interaction parameter from the second profile of the first user is added to the first profile of the first user, and the second profile of the first user is deleted.

Alternatively, for example, the first profile of the first user is updated once per week, and the period of activity of the second profile of the first user is one day. For the purposes of the present technology, the activity period of the second profile of the first user does not exceed the updating period of the first profile of the first user.

At a time thereafter, the server 112 can obtain the second request 160 to provide the access to the profile of the second user from the second electronic device 106. It should be recalled that the first profile of the first user has been previously generated based on the user interaction parameters received over the predetermined time period associated with the plurality of communication sessions, and the first profile of the first user has been stored in the first database 120. It should be also recalled that the second profile of the first user has been generated based on at least one user interaction parameter, which is different from the user interaction parameters in the first profile of the first user. The second profile of the first user has been stored in the second database 122.

In response to receiving the second request 160, the server 112 is configured to retrieve a first profile of the first user from the first database 120 and the second profile of the first user from the second database 122. The server 112 is further configured to compare the user interaction parameters stored in the first profile of the first user and the second profile of the first user with the current interaction parameters of the user, who sent the second request 160 to provide the access to the profile of the first user from the second electronic device 106.

In response to determining a match between the user interaction parameters stored in the first profile of the first user and/or the second profile of the first user and the user interaction parameters during the communication session while sending the second request 160, the server 112 is configured to provide the access to the profile of the first user.

In response to at least one user interaction parameter in the second request 160 differing from the user interaction parameters stored in the first profile of the first user, the server 112 is configured to perform a verification action associated with the first user. The verification action can comprise, for example, sending a control request 162 to the second electronic device 106, which has sent the second request 160. Alternatively or additionally, the verification action can comprise sending a message with a link, which a user needs to follow to verify the action, to additional email address of the first user.

In those cases where the verification action is not confirmed, (for example, no correct answer to the control request 162 was received), the server 112 is configured to deny the access to the profile of the first user in response to the second request 160 received from the second electronic device 106.

Upon receiving the confirmation, in response to the verification action, the server 112 is configured to generate a third profile of the first user including the at least one interaction parameter of the first user, which is different from the interaction parameters stored in the first profile of the first user and the interaction parameter in the second profile of the first user. The third profile of the first user can be stored, for example, in the second database 122 available to the server 112.

Much akin to the second profile of the first user, the third profile of the first user has a limited activity period. In accordance with some non-limiting embodiments of the present technology, upon expiration of the limited activity period, the third profile of the first user is deleted from the second database 122.

In accordance with some non-limiting embodiments of the present technology, the server 112 is configured to periodically update the first profile of the first user, such that the interaction parameter of the first user from the third profile of the first user still valid at the moment of updating of the first profile of the first user, is added to the first profile of the first user.

In accordance with some non-limiting embodiments of the present technology, the activity period of the third profile of the first user does not exceed the updating period of the first profile of the first user. If at the moment of updating the first profile of the first user, the third profile of the first user is still active, the user interaction parameter from the third profile of the first user is included into the first profile of the first user, and the third profile of the first user is deleted.

The processor of the server 112 can be configured to set various activity periods for the second profile of the first user and the third profile of the first user depending on the user interaction parameters and the difficulty of the verification action. Alternatively, the activity period of the second profile of the first user and the third profile of the first user can be set by the first user in profile settings of the first user.

Without departing from the scope of the present technology, it is possible to generate additional profiles of the first user with the limited activity period (e.g. the second profile of the first user and the third profile of the first user).

The server 112 can be configured to analyze "application agnostic parameters" of the user-device interaction class. These parameters may include, inter alia: click-pattern associated with users; input speed pattern associated with users; mouse movement pattern associated with users.

In some additional embodiments of the present technology, the server 112 can be configured to analyze user interaction parameters, associated with the electronic service, that is different from the ones provided by the server 112. In some embodiments of the present technology, the server 112 can be configured to receive information representative of user-device interaction parameters, associated with other electronic services, which are different from the ones hosted by the server 112. This information can be received, for example, through an Application Programming Interface (API) with other servers (not depicted) responsible for delivering other services for which the user has subscribed.

In some embodiments of the present technology, the user can be authenticated in the electronic service provided by the server 112 and the other services by means of a single sign in credential application. Examples of the single sing-on are known in the art and may include, inter alia, Yandex.Passport™ provided by the Yandex™ search engine, Google+™ single sing-on, etc. In some embodiments of the present technology, the server 112 can receive an indication of user-device interaction parameters from a another server (not depicted) responsible for handling single sign in credential service. In other embodiments, each of the other services may be associated with separate log in credentials and within those embodiments, the server 112 can receive an indication of user-device interaction parameters from an aggregation server (not depicted) responsible for aggregating user behavior information or the server 112 can additionally act as an aggregation server.

In some embodiments, the various sources of the user-device interaction parameters can be servers (not depicted) responsible for execution of anti-spam services, geo-location servers, targeted advertising servers and the like. Some of these servers can be the same as the server 112 and some of these can be executed as separate servers, which are configured to exchange data with the server 112 via suitable APIs and the like.

In some embodiments of the present technology, the user interaction parameter can be embodied as one or more of the typical IP addresses associated with the electronic devices (such as the first electronic device 102 and the second electronic device 106) the user uses to connect to the service provided by the server 112. In other implementations of the present technology, the user interaction parameter can be an indication of the user agent, who can be included in the request to provide the access to the profile of the first user (for example, the first request 150 and the second request 160) sent to the server 112. The indication of the user agent can be an identifier of a browser used (such as Yandex™ browser, Google™ Chrome™ browser, Opera™ browser or the like). Alternatively, the indication of the user agent can be a version of the browser used or a combination of the identifier and the version of the browser used, a version of the operating system of the electronic device, and the like.

Figure 2:
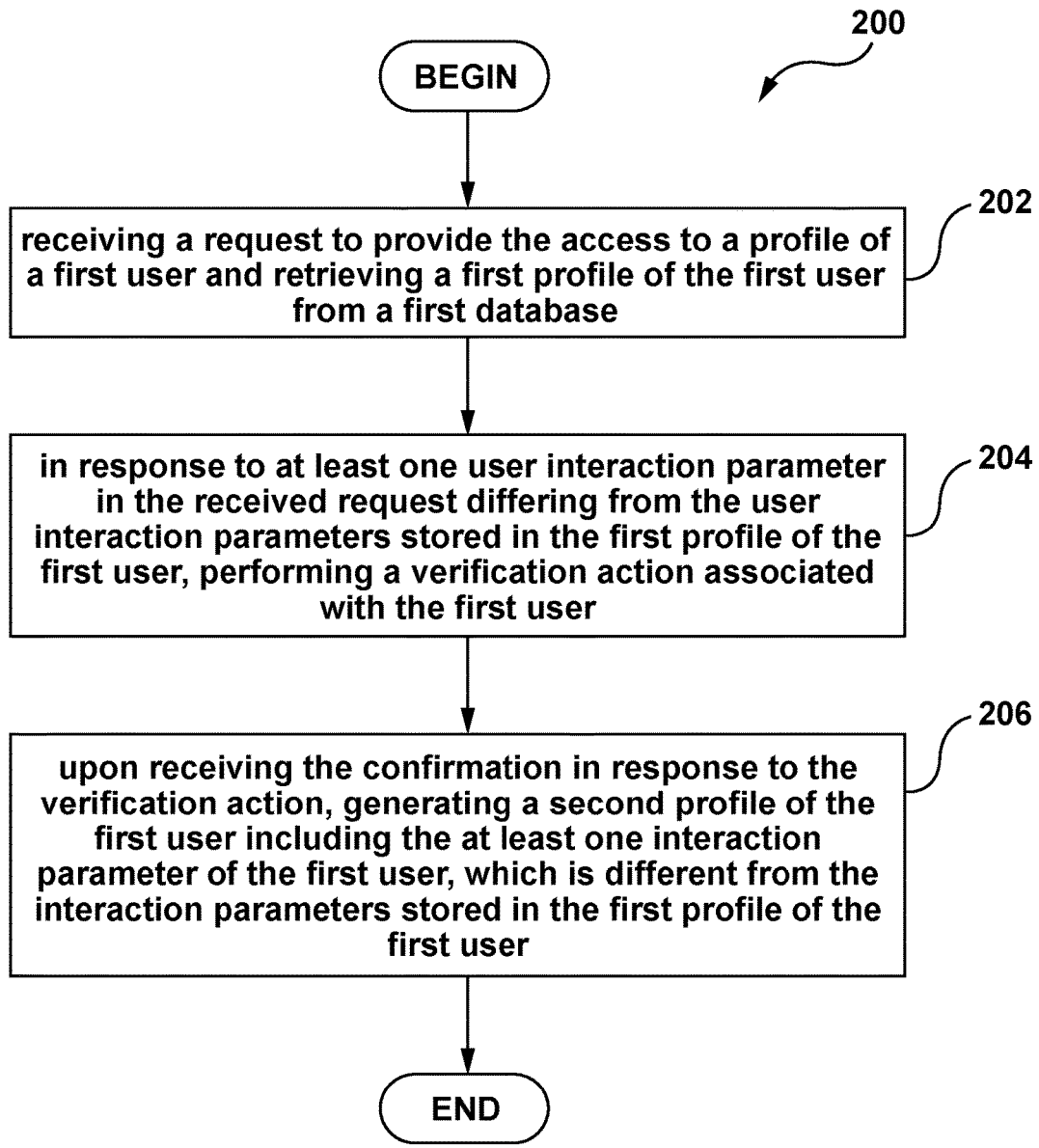
FIG. 2 depicts a flow diagram of a method of generating a user profile implemented in accordance with non-limiting embodiments of the present technology.

Given the above-described architecture, it is possible to implement the method of generating of the user profile. With reference to FIG. 2, there is depicted a block diagram of a method 200, the method 200 being executed in accordance with non-limiting embodiments of the present technology.

The method 200 can be executed by the server 112 and, more specifically, by the processor of the server 112.

Step 202—Receiving a Request to Provide the Access to a Profile of a First User and Retrieving a First Profile of the First User from a First Database Method 200 starts at the step 202, where the server 112 receives the first request 150 to provide access to the profile of the first user and to retrieve the first profile from the first database 120. The first request 150 to provide the access to the profile of the first user can be executed in a form of sending authentication data of the first user to the server 112. For example, the first request can be executed as sending a login and a password to log in to an email service. Along with the first request 150, the server 112 receives at least one user interaction parameter.

It is noted that prior to step 202, the server 112 has generated the first profile of the first user based on the user interaction parameters received over the predetermined period of time and associated with the plurality of communication sessions, and the first profile of the first user has been stored in the first database 120.

The user interaction parameter can be implemented as at least one of: a network address associated with the user device, which is usually used for establishing communication sessions; geo-location information associated with the usual location of the user device; a version of a browser application used to establish communication sessions; a version of an operating system of the user device, a click-pattern associated with the user; a mouse movement pattern associated with the user; a input pattern associated with the user; a function usage pattern associated with the user; the time pattern of the user, in which the user sessions are usually established.

Further, the method 200 proceeds to step 204.

Step 204—in Response to at Least One User Interaction Parameter in the Received Request Differing from the User Interaction Parameters Stored in the First Profile of the First User, Performing a Verification Action Associated with the First User At the step 204, the server 112 compares the interaction parameters stored in the first profile of the first user with the at least one user interaction parameter received in the first request 150.

In response to at least one user interaction parameter in the received first request 150 differing from the user interaction parameters stored in the first profile of the first user, the processor of the server 112 performs a verification action associated with the first user.

Step 206—Upon Receiving the Confirmation in Response to the Verification Action, Generating a Second Profile of the First User Including the at Least One Interaction Parameter of the First User, which is Different from the Interaction Parameters Stored in the First Profile of the First User At the step 206, upon receiving the confirmation in response to the verification action, the processor of the server 112 generates the second profile of the first user including the at least one interaction parameter of the first user, which is different from the interaction parameters stored in the first profile of the first user.

In some embodiments of the method 200, after generating the second profile of the first user, the second profile of the first user is stored in the second database 122 associated with the server 112.

In some embodiments of the method 200, the second profile of the first user is stored in the first database 120.

In some embodiments of the method 200, the second profile of the first user has a limited activity period.

In some embodiments of the method 200, after expiration of the limited activity period, the second profile of the first user is deleted.

In some embodiments of the method 200, after generating the second profile of the first user in response to receiving the second request 160 to access the profile of the first user, the method 200 further comprises performing retrieving the second profile of the first user and the first profile of the first user; in response to the user interaction parameter in the received second request 160 being different from the user interaction parameters stored in the first profile of the first user, but matching the interaction parameter stored in the second profile of the first user, updating the activity period of the second profile of the first user.

In some embodiments of the method 200, the method 200 further comprises periodically updating the first profile of the first user, and the interaction parameter of the first user from the second profile of the first user still valid at the moment of updating of the first profile of the first user, is added to the first profile of the first user.

In some embodiments of the method 200, the activity period of the second profile of the first user does not exceed the updating period of the first profile of the first user.

In some embodiments of the method 200, after generating the second profile of the first user and in response to receiving the second request 160 to provide access to the profile of the first user, the method 200 further comprises: retrieving the second profile of the first user and the first profile of the first user is executed.

In response to at least one user interaction parameter in the received second request 160 being different from the user interaction parameters stored in the first profile of the first user and the second profile of the first user, the method 200 further comprises executing a second verification action associated with the first user. Responsive to receiving a confirmation in response to the second verification action, the method 200 further comprises generating a third profile of the first user including the at least one interaction parameter of the first user, which is different from the interaction parameters in the first profile of the first user and the second profile of the first user.

In some embodiments of the method 200, the third profile of the first user has a limited activity period.

In some embodiments of the method 200, upon expiry of the limited activity period is expired, the third profile of the first user is deleted.

In some embodiments of the method 200, the method 200 further comprises periodically updating the first profile of the first user. As part of the periodical update, the interaction parameter of the first user from the third profile of the first user still valid at the moment of updating the first profile of the first user, is added to the first profile of the first user.

In some embodiments of the method 200, the periodical updating the first profile of the first user further includes adding interaction parameters of the first user from the second and the third profiles of the first user operating at the moment of updating of the first profile of the first user to the first profile of the first user.

The generated profile can be further used to authorize the user and to provide access to the service (for example, the email service, social network service and so on).

The method 200 can then terminate or return to executing step 202.

Figure 3:
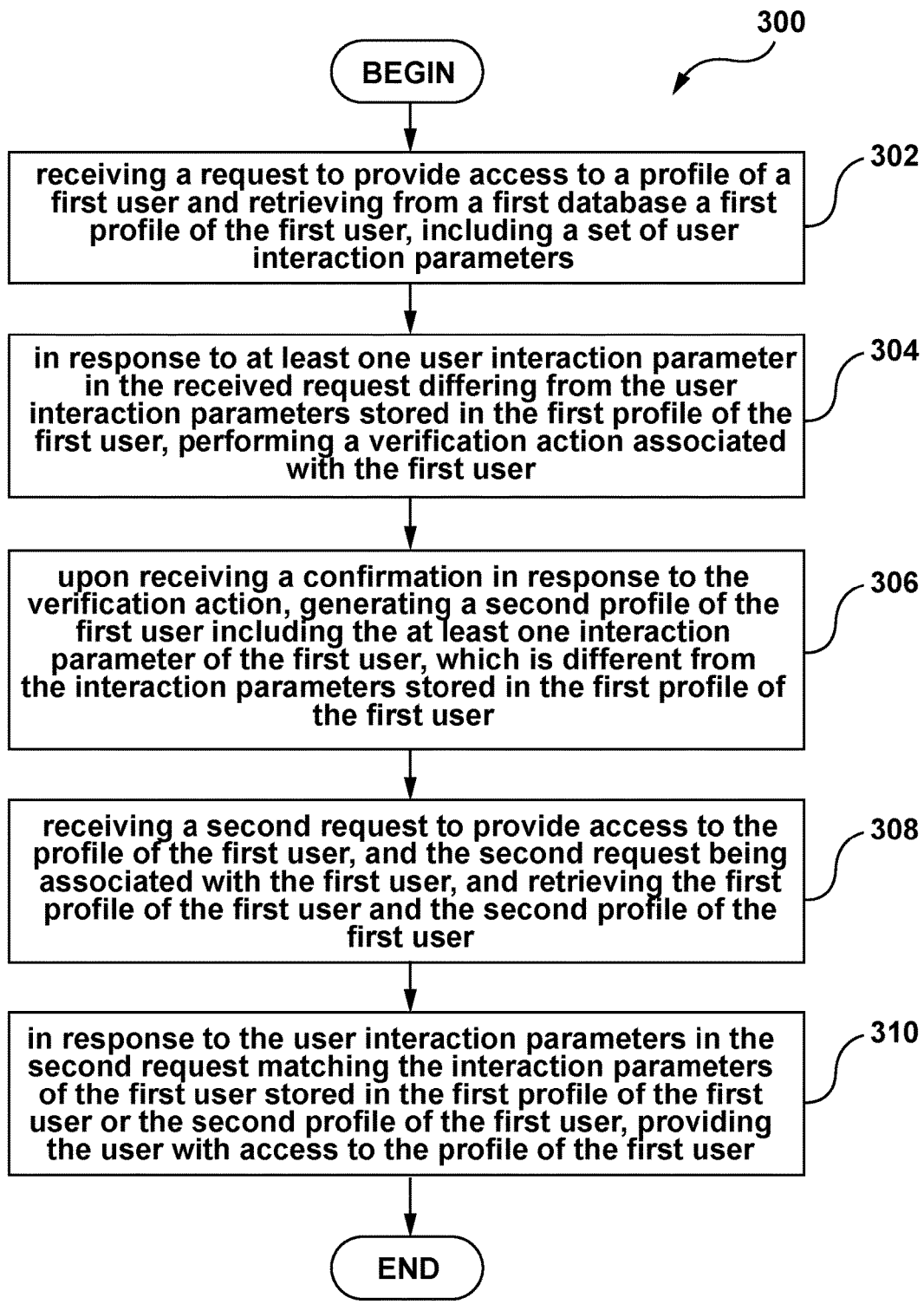
FIG. 3 depicts a flow diagram of a method of user authentication implemented in accordance with non-limiting embodiments of the present technology.

Given the architecture described above, it is possible to execute a method of user authentication. The method may be executable at a server. With reference to FIG. 3, there is depicted a block diagram of a method 300, the method 300 being executed in accordance with some other non-limiting embodiments of the present technology. The method 300 can be executed by the server 112 and, more specifically, by the processor of the server 112.

Step 302—Receiving a Request to Provide Access to a Profile of a First User and Retrieving from a First Database a First Profile of the First User, Including a Set of User Interaction Parameters The method 300 starts at step 302, where the server 112 receives a first request 150 from the first electronic device 102 to provide access to the profile of the first user. The server 112 then retrieves from the first database 120 the first profile of the first user, including the set of user interaction parameters.

The first request 150 is to provide access to the profile of the first user can be implemented as receiving authentication data of the first user to the server 112. For example, the first request 150 can be implemented a data packet containing a login and a password to log in sent to the email service. Along with the first request 150, the server 112 further receives at least one user interaction parameter.

Prior to execution of step 302, the server 112 has generated the first profile of the first user based on the user interaction parameters received over the predetermined period of time and associated with the plurality of communication sessions, and the first profile of the first user has been stored in the first database 120.

The user interaction parameter can be implemented as at least one of: a network address associated with the user device, which is usually used for establishing communication sessions; geo-location information associated with the usual location of the user device; a version of a browser application used to establish communication sessions; a version of an operating system of the user device, a click-pattern associated with the user; a mouse movement pattern associated with the user; a input pattern associated with the user; a function usage pattern associated with the user; the time pattern of the user, in which the user sessions are usually established.

Further, method proceeds to step 304.

Step 304—in Response to at Least One User Interaction Parameter in the Received Request Differing from the User Interaction Parameters Stored in the First Profile of the First User, Performing a Verification Action Associated with the First User At the step 304, the server 112 compares the interaction parameters stored in the first profile of the first user with the at least one user interaction parameter received in the first request 150.

In response to at least one user interaction parameter in the received first request 150 differing from the user interaction parameters stored in the first profile of the first user, the processor of the server 112 performs a verification action associated with the first user.

Further, method proceeds to step 306.

Step 306—Upon Receiving a Confirmation in Response to the Verification Action, Generating a Second Profile of the First User Including the at Least One Interaction Parameter of the First User, which is Different from the Interaction Parameters Stored in the First Profile of the First User At the step 306, upon receiving a confirmation in response to the verification action, the processor of the server 112 generates the second profile of the first user including the at least one interaction parameter of the first user, which is different from the interaction parameters stored in the first profile of the first user.

In some non-limiting embodiments of the method 300, the second profile of the first user has a limited activity period.

In some non-limiting embodiments of the method 300, upon expiration of the limited activity period is expired, the second profile of the first user is deleted.

Further, method proceeds to step 308.

Step 308—Receiving a Second Request to Provide Access to the Profile of the First User, and the Second Request being Associated with the First User, and Retrieving the First Profile of the First User and the Second Profile of the First User At the step 308, the server 112 receives the second request 160 to provide access to the profile of the first user. The second request 160 is associated with the first user, i.e. just like in the first request 150, user credentials of the first user were entered correctly. The processor of the server 112 is configured to retrieve the first profile of the first user from the first database 120 and to retrieve the second profile of the first user from the second database 122.

Further, method proceeds to step 310.

Step 310—in Response to the User Interaction Parameters in the Second Request Matching the Interaction Parameters of the First User Stored in the First Profile of the First User or the Second Profile of the First User, Providing the User with Access to the Profile of the First User In some non-limiting embodiments of the method 300, after generating the second profile of the first user in response to receiving the second request 160 to access the profile of the first user, the processor of the server 112 performs: retrieving of the second profile of the first user and the first profile of the first user; in response to the user interaction parameter in the received second request 160 being different from the user interaction parameters stored in the first profile of the first user, but matching the interaction parameter stored in the second profile of the first user, the method 300 further comprises updating the activity period of the second profile of the first user.

As such, in case of re-using the user interaction parameter from the second profile of the first user with the limited activity period, this limited activity period of the second profile of the first user can be updated (the activity period is prolonged). For example, if the limited activity period of the second profile of the first user is 1 day, then, if the user will daily send the requests to provide the access by using the user interaction parameter from the second profile of the first user, then the limited activity period of the second profile of the first user will be "prolonged" every time for one day more until it is, for example, included into the first profile of the first user, or deleted.

Alternatively, at the step 310, in response to at least one user interaction parameter in the second request differing from the user interaction parameters stored in the first profile of the first user and the second profile of the first user, performing the second verification action associated with the first user.

In some non-limiting embodiments of the method 300, upon the receiving of a confirmation in response to the second verification action, the method 300 further comprises generating a third profile of the first user, including the one interaction parameter of the first user, which is different from the interaction parameters stored in the first profile of the first user and the second profile of the first user, and providing the access to the user profile.

In some non-limiting embodiments of the method 300, the method 300 further comprises periodically updating the first profile of the first user. As part of periodical update, the interaction parameter of the first user from the second profile of the first user still valid at the moment of updating of the first profile of the first user is added to the first profile of the first user. Similarly, other active profiles of the first user with the limited activity period, for example, the third profile of the first user, can be added into the first profile of the first user.

In some non-limiting embodiments of the method 300, the activity period of the second profile of the first user does not exceed the updating period of the first profile of the first user. As it was noted above, the first profile of the first user can be updated, for example, once per day, and the activity period of the second profile of the first user is only one hour.

As such, not every profile of the first user with the limited activity period (temporary short-term profile) will be included into the first profile of the first user (permanent long-term profile).

In some non-limiting embodiments of the method 300, the third profile of the first user has a limited activity period.

In some non-limiting embodiments of the method 300, upon expiration of the limited activity period, the third profile of the first user is deleted.

In some non-limiting embodiments of the method 300, the method 300 further comprises periodically updating the first profile of the first user. As part of periodical update, the interaction parameter of the first user from the third profile of the first user operating at the moment of updating of the first profile of the first user is added to the first profile of the first user.

In some non-limiting embodiments of the method 300, as part of the periodical updating the first profile of the first user, the interaction parameters of the first user from the second and the third profiles of the first user operating at the moment of updating of the first profile of the first user, is added to the first profile of the first user.

Therefore, if the user constantly uses a new user interaction parameter, for example, sends the requests 150, 160 to the server 112 from the first electronic device 102 and/or the second electronic device 106 with the interaction parameters that are different from those stored in the second profile of the first user and the third profile of the first user, then the corresponding new user interaction parameters will be stored in the first profile of the first user, and in the future, no additional verification actions will be needed to log in using the given new interaction parameters (for example, log in from the second electronic device 106).

If the user is not be using the new interaction parameter from the third profile of the first user and/or the second profile of the first user, then, after the activity period corresponding the second and/or the third profile of the first user (if it happens before the update of the first profile of the first user), the given new interaction parameter will be deleted and not stored in the first profile of the first user.

The method 300 can then terminate or return to executing step 302.

In present description there is depicted one illustrative example comprising one long-term profile (the first profile of the first user) and two profiles with the limited activity period (the second profile of the first user, the third profile of the first user). However, without departing from the scope of the present technology, in others embodiments of the technology, others scenarios and other number of long-term profiles of the first user and the profiles of the first user with the limited activity period are also possible.

Scenario 1: for example, if the user has sent 10 requests over the updating period of the long-term profile (the first profile of the first user), and each request includes various new user interaction parameters and confirms the verification action, there will be generated 10 profiles with the limited activity period, much akin to the second profile of the first user and the third profile of the first user.

Scenario 2: Alternatively, let it be assumed that the interaction parameter of the first user in the first profile of the first user indicates the usual user location while sending requests associated with Moscow. The user is sending the request to provide access to the server 112 from a new location, for example, Montreal (Canada), i.e. with a new user interaction parameter. Then the user confirms the verification action implemented by the server 112. The server 112 generates a new profile with the limited activity period (the second profile of the first user) including the new user interaction parameter (location, Montreal). In the activity period of the second profile of the first user (for example, one day) the user can access the profile of the first user (for example, an email service) using the new user interaction parameter (location, Montreal) without any additional verification actions. After the activity period of the second profile of the first user is expired, the user will be, once again, provided with the verification action when sending a request to provide the access to the server 112 from a new location, for example, Montreal (Canada), i.e. with the new user interaction parameter. Alternatively, if at the moment of updating the first profile of the first user the second profile of the first user is still active, the user interaction parameter (location, Montreal) will be added to the first profile of the first user, and then, in the future, when the user sends the request to provide the access with the given user interaction parameter (location, Montreal), (s)he will be granted access without any additional verification actions.

Scenario 3: The interaction parameter of the first user in the first profile of the first user indicates the usual device, using which the user sends the requests to provide the access, for example, the first electronic device 102. The user then sends the request to provide access to the server 112 from a new device, for example, the second electronic device 106, i.e. with a new user interaction parameter. Then the user confirms the verification action implemented by the server 112. The server 112 generates a new profile with the limited activity period (the third profile of the first user) comprising the new user interaction parameter (log in from the second electronic device 106). Let it be assumed that the user has signed on from other person's device (the second electronic device 106 because his(her) usual device (the first electronic device 102) was unavailable. In other words, (s)he is not planning to use this new device in the future, however, his (her) credentials can be stored in the cache of the browser application of the second electronic device 106. After the activity period of the third profile of the first user is expired, it is deleted and, hence, if an unauthorized user sends future requests to provide the access to the profile of the first user from the second electronic device 106, which still has the credentials of the first user stored, the server 112 initiates executing of the verification action. In other words, the server 112 will not provide the access to the profile of the first user without the additional verification action.

Modifications and improvements to the above-described implementations of the present technology may become apparent to those skilled in the art. The scope of the present technology is therefore intended to be limited solely by the scope of the appended claims. Thus, the scope of present technology is limited by the scope of the appended claims only.

The invention claimed is:

1. A method of generating a user profile, the method executable at a server, the server having previously generated a first profile of a first user based on user interaction parameters received over a predetermined period of time and associated with a plurality of communication sessions, the first profile being associated with an updating period for updating the first profile, the first profile of the first user having been stored in a first database associated with the server, the method comprising:
   receiving a request to provide access to the first profile of the first user;
   retrieving the first profile of the first user from the first database;
   in response to at least one user interaction parameter in the request differing from the user interaction parameters in the first profile of the first user, performing a verification action associated with the first user;
   upon receiving a confirmation in response to the verification action, generating a second profile of the first user including the at least one interaction parameter of the first user, which is different from the interaction parameters in the first profile of the first user, the second profile being associated with a limited activity period, the limited activity period being extendable in response to the first user continuing to use interaction parameters different from the user interaction parameters in the first profile of the first user, but matching the interaction parameters in the second profile of the first user;
   at the updating period of the first profile:
      in response to the limited activity period of the second profile being non-expired at a given iteration of the updating period, adding to the first profile of the first user the interaction parameter of the first user from the second profile of the first user; and
      deleting the second profile.

2. The method of claim 1, wherein in response to the limited activity period of the second profile being expired at the given iteration of the updating period, deleting the second profile without adding to the first profile of the first user the interaction parameter of the first user from the second profile of the first user.

3. The method of claim 1, wherein the activity period of the second profile of the first user does not exceed the updating period of the first profile of the first user.

4. The method of claim 1, further comprising in response to receiving a second request to provide the access to the second profile of the first user the second profile being non-expired:
   retrieving the second profile of the first user and the first profile of the first user;
   in response to at least one user interaction parameter in the received second request differing from both the user interaction parameters in the first profile of the first user and the second profile of the first user, performing a second verification action associated with the first user;
   upon receiving the confirmation in response to the second verification action, generating a third profile of the first user including the at least one interaction parameter of the first user, which is different from the interaction parameters in the first profile of the first user and the second profile of the first user, the third profile being associated with a third-profile limited activity period, the third-profile limited activity period being extendable in response to the first user continuing to use interaction parameters different from the user interaction parameters in the first profile of the first user, but matching the interaction parameters in the third profile of the first user;

at the updating period of the first profile:
  in response to the third-profile limited activity period of the third profile being non-expired at a given iteration of the updating period, adding to the first profile of the first user the interaction parameter of the first user from the third profile of the first user; and
  deleting the third profile.

5. A server for generating a user profile, the server comprising:
  at least one database;
  a hardware processor configured to access the at least one database, the hardware processor having previously generated a first profile of the first user based on user interaction parameters received over a predetermined period of time and associated with a plurality of communication sessions, the first profile being associated with an updating period for updating the first profile, the first profile of the first user having been stored in the first database;
  the hardware processor being further configured to:
    receive a request to provide access to the first profile of the first user;
    retrieve the first profile of the first user from the first database;
    in response to at least one user interaction parameter in the received request differing from the user interaction parameters in the first profile of the first user, perform a verification action associated with the first user;
    upon receiving the confirmation in response to the verification action, generate a second profile of the first user including the at least one interaction parameter of the first user, which is different from the interaction parameters in the first profile of the first user, the second profile being associated with a limited activity period, the limited activity period being extendable in response to the first user continuing to use interaction parameters different from the user interaction parameters in the first profile of the first user, but matching the interaction parameters in the second profile of the first user;
    at the updating period of the first profile:
      in response to the limited activity period of the second profile being non-expired at a given iteration of the updating period, adding to the first profile of the first user the interaction parameter of the first user from the second profile of the first user; and
      deleting the second profile.

6. A method for authenticating a user, the method executable at a server, the method comprising:
  receiving a request to provide the access to a profile of a first user;
  retrieving from a first database a first profile of the first user, the first profile being associated with an updating period for updating the first profile, the first profile of the first user including a set of user interaction parameters;
  in response to at least one user interaction parameter in the request differing from the user interaction parameters in the first profile of the first user, performing a verification action associated with the first user;
  upon receiving a confirmation in response to the verification action, generating a second profile of the first user including the at least one interaction parameter of the first user, which is different from the interaction parameters in the first profile of the first user, the second profile being associated with a limited activity period;
  receiving a second request to provide the access to the profile of the first user, the second request being associated with the first user, retrieving the first profile of the first user and the second profile of the first user;
  in response to the user interaction parameters in the second request matching the interaction parameters of the first user in the first profile of the first user or the second profile of the first user, providing the user with the access to the profile of the first user;
  in response to the user interaction parameter in the second request being different from the user interaction parameters in the first profile of the first user, but matching the interaction parameter in the second profile of the first user, updating the activity period of the second profile of the first user;
  at the updating period of the first profile:
    in response to the limited activity period of the second profile being non-expired at a given iteration of the updating period, adding to the first profile of the first user the interaction parameter of the first user from the second profile of the first user; and
    deleting the second profile.

7. The method of claim 6, wherein, in response to at least one user interaction parameter in the second request differing from the user interaction parameters in the first profile of the first user and the second profile of the first user, performing a second verification action associated with the first user.

8. The method of claim 7, wherein, upon the receiving a confirmation in response to the second verification action, generating a third profile of the first user, including the at least one interaction parameter of the first user, which is different from the interaction parameters in the first profile of the first user and the second profile of the first user, and providing the access to the user profile;
  in response to the user interaction parameter in the second request being different from the user interaction parameters in the first profile of the first user, but matching the interaction parameter in the second profile of the first user, updating the activity period of the second profile of the first user;
  at the updating period of the first profile:
    in response to the limited activity period of the third profile being non-expired at a given iteration of the updating period, adding to the first profile of the first user the interaction parameter of the first user from the third profile of the first user; and
    deleting the third profile.

9. The method of claim 6, wherein the profile of the first user is associated with at least one service, and wherein the providing the access to the profile of the first user comprises providing the access to the at least one service associated with the profile of the first user.

10. The method of claim 6, wherein the user interaction parameter comprises one of: a network address associated with a user device used for establishing communication sessions with the user device; geo-location information associated with a location of the user device; a version of a browser application used to establish communication sessions with the user device; a version of an operating system of the user device, a click-pattern associated with a user of the user device; a mouse movement pattern associated with the user of the user device; a input pattern associated with the user of the user device; a function usage pattern associated with the user of the user device; a time pattern of usage of the user device by the user.

11. The method of claim 6, wherein expiration of the limited activity period, the method further comprises deleting the second profile of the first user without adding to the first profile of the first user the interaction parameter of the first user from the second profile of the first user.

12. The method of claim 6, wherein the activity period of the second profile of the first user does not exceed the updating period of the first profile of the first user.

\* \* \* \* \*